(12) United States Patent
Oren (10) Patent No.: US 7,665,292 B2
(45) Date of Patent: Feb. 23, 2010

(54) THRUSTER WITH ELECTRO-THERMAL THRUST AUGMENTATION

(75) Inventor: Aharon Oren, Haifa (IL)

(73) Assignee: Rafael Armament Development Authority Ltd., Haifa (IL)

(*) Notice: Subject to any disclaimer, the term of this patent is extended or adjusted under 35 U.S.C. 154(b) by 334 days.

(21) Appl. No.: 11/435,482

(22) Filed: May 17, 2006

(65) Prior Publication Data
US 2007/0074501 A1    Apr. 5, 2007

Related U.S. Application Data

(63) Continuation of application No. PCT/IL2004/001108, filed on Dec. 6, 2004.

(30) Foreign Application Priority Data
Dec. 8, 2003    (IL)    .................................... 159248

(51) Int. Cl.
*F03H 1/00*    (2006.01)
(52) U.S. Cl. ...................... 60/203.1; 60/218; 60/39.462
(58) Field of Classification Search ................ 60/203.1, 60/218, 228, 39.462
See application file for complete search history.

(56) References Cited

U.S. PATENT DOCUMENTS

| 3,583,161 | A | * | 6/1971 | Simms ...................... 60/203.1 |
|---|---|---|---|---|
| 4,305,247 | A |   | 12/1981 | Ellion et al. |
| 4,322,946 | A |   | 4/1982 | Murch et al. |
| 4,510,377 | A | * | 4/1985 | Merritt et al. ................ 219/550 |
| 4,523,429 | A | * | 6/1985 | Bingley ...................... 60/203.1 |
| 4,656,828 | A |   | 4/1987 | Bingley et al. |
| 4,730,449 | A |   | 3/1988 | Cann |
| 5,819,526 | A |   | 10/1998 | Jackson et al. |
| 6,272,846 | B1 | * | 8/2001 | Schneider ..................... 60/218 |

FOREIGN PATENT DOCUMENTS

JP        61-232370    A    * 10/1996

* cited by examiner

*Primary Examiner*—Ted Kim
(74) *Attorney, Agent, or Firm*—Cohen Pontani Lieberman & Pavane LLP (57) ABSTRACT

A thruster for exo-atmospheric vehicles with electro-thermal thrust augmentation and having internally embedded heating elements for direct contact heating of gaseous products released by a propellant, particularly hydrazine, so as to increase the Specific Impulse (Isp) of the thruster. The electrical heating elements are resistant to hydrazine products. The thruster is configured as a closed sealed chamber divided into a decomposition section upstream and a heating section downstream. At least one heating element is disposed in the heating section, directly in a mixture catalyst forming a porous bed, or within a concentric ceramic tube operative as a heat exchanger, to heat the gaseous products by direct contact. The heater indirectly heats the catalyst in the decomposition section and directly heats the heating section. The thruster is operable both in space and at sea-level gravity and barometric pressure.

21 Claims, 5 Drawing Sheets

THRUSTER WITH ELECTRO-THERMAL THRUST AUGMENTATION

The present application claims the benefit of Israel Patent Application No. 159248 filed on 8 Dec. 2003 and is a Continuation of PCT/IL2004/001108 filed on 6 Dec. 2004

FIELD OF THE INVENTION

The present invention relates to thrust augmentation of liquid propellant rocket thrusters in general, wherein the thrust augmentation is achieved by electro-thermally heating the gaseous propellant products, and in particular to hydrazine rocket thrusters used for maneuvering and for station-keeping of satellites and spacecraft.

BACKGROUND OF THE INVENTION

The orbits and the orientations of satellites and of other exo-atmospheric vehicles, referred to as "EV" hereinbelow, require correction to compensate for the effect of drag and drift, to correct trajectory such as for insertion into orbit and for change of orbit, and for fulfilling further operational requirements. Some of these corrections are carried out by small rocket thrusters, named "thrusters" hereinbelow, using hydrazine or other liquids as propellants, which thrusters are operated whenever a functional need arises. In the following description, hydrazine propellant is discussed, although additional liquid propellants are compatible for use within the scope of the present invention.

Many EVs are equipped with a fairly large number of such thrusters, e.g. twelve. Those thrusters of an EV, which operate in steady mode firing, may be replaced by the thruster with electro-thermal thrust augmentation, for the sake of more efficient use of the propellant. When compared with existing electro-thermal augmented thrusters, the thruster of the present invention presents benefits such as reduced weight, lower production costs and expedient assembly. The saved weight is then available for additional payload and/or for supplementary propellant.

Evidently, there are severe weight and volume limitations for an EV. The amount of propellant carried on board is usually the decisive factor limiting the useful operational life of an EV. Furthermore, the propellant supply of the EV cannot usually be replenished after launch, and hence, once exhausted, the EV can no longer be controlled or maneuvered.

The ratio between the total impulse, divided by the propellant weight used to generate it, is defined as the Specific Impulse, and is designated as Isp. Consequently, the higher the specific impulse, the lower the propellant mass required to provide a given impulse. The Isp depends primarily on the properties of the propellant, but improved thruster designs may effectively augment the obtained Isp. Specific Impulse, or Isp, is measured in N-sec/kg, and for hydrazine, a typical value obtained for a commonly known, unaugmented thruster design is 2220 N-sec/kg.

Hydrazine and other monopropellants differ from other liquid propellants by the use of a catalyst for causing exothermic reaction of the propellant into gaseous products, in contrast with conventional bi-propellant reaction between a fuel and an oxidizer.

The basic structure and operation mode of a hydrazine thruster and of other monopropellant thrusters is described below. A propellant control valve controls duration of propellant supply, while the mass flow rate of the propellant is governed mostly by the inlet pressure of the propellant injected into the thruster's chamber. The injected propellant contacts a preferably pre-heated catalyst and is decomposed exothermally into hot gaseous products, which are then ejected into space through a nozzle. Specifically for hydrazine thrusters, ammonia, which is part of the decomposed products, is further partially dissociated through an endothermic process as it passes through the remainder of the catalyst.

In current design practice, the catalyst is heated by an electric resistive heater assembled as an external unit, referred to below as "catalyst heater", mounted outside, or on an outside portion of a conventional thruster. The catalyst heater raises the temperature to a range of preferably 100° C. to 200° C., and requires electric power in the order of magnitude of a few Watts.

Known thruster designs take advantage of the fact that most EVs include a solar electric power supply system, whose power output is at times well in excess of the EV's various requirements. The excess power output may thus be applied for the heating of the gaseous products through the use of filaments forming another electric resistor heater, or "heater" hereinbelow, before their ejection out of the thruster and into space, as taught, for example by U.S. Pat. No. 4,305,247 by Ellion et al., and by U.S. Pat. No. 4,569,198 No. by Cann. This additional thermal energy is added to the gaseous products—minus the heat losses—and raises the temperature of the ejected gases, thereby contributing to a higher Isp value. Typically, such a heater provides a power of about 600 to 1000 Watts per Newton of thrust, and may increase the Isp of a thruster by several tens of percents.

U.S. Pat. No. 4,305,247 to Ellion et al. is for augmenting specific impulse by heating gasses, as recited in column 1, lines 6-9: "This invention is directed to a hydrazine thruster which has augumented specific impulse by heating of the gases which are the product of hydrazine dissociation", which is achieved as recited in column 3, lines 32-34, by use of: "an electrically resistive tubular ceramic resistance heater positioned for heating gas in said heater chamber".

However, it is further stated, from column 3, line 35, to column 4, line 4 that: "an exterior protector tube positioned around the exterior of said tubular ceramic resistance heater and an interior protector tube positioned within said tubular ceramic resistance heater, said protector tubes being heated by said tubular ceramic resistance heater to prevent hot gas from the decomposition chamber from flowing directly against said tubular ceramic resistance heater, said protector tubes being positioned so that hot gas flows both exteriorly and interiorly thereof", which clearly describe indirect heating of the gas since an exterior protection tube and an interior protection tube prevent hot gas from flowing in direct contact with the heater.

The present invention utilizes direct heating in contrast with Ellion et al. who use indirect heating, which suffers from heat losses, and is evidently less efficient than direct heating.

U.S. Pat. No. 4,322,946 by Murch et al. claim a heater, or a superheater for heating gasses, as by its title: "Thermal thruster with superheater". Murch et al. recite in col 3, lines 11-15: "The superheater continuously and steadily imparts energy to gases emitted from the heater chamber to provide a sensibly constant power output with no discontinuity or irregularities. The superheater increases the temperature of the chamber gases".

Figure 1:
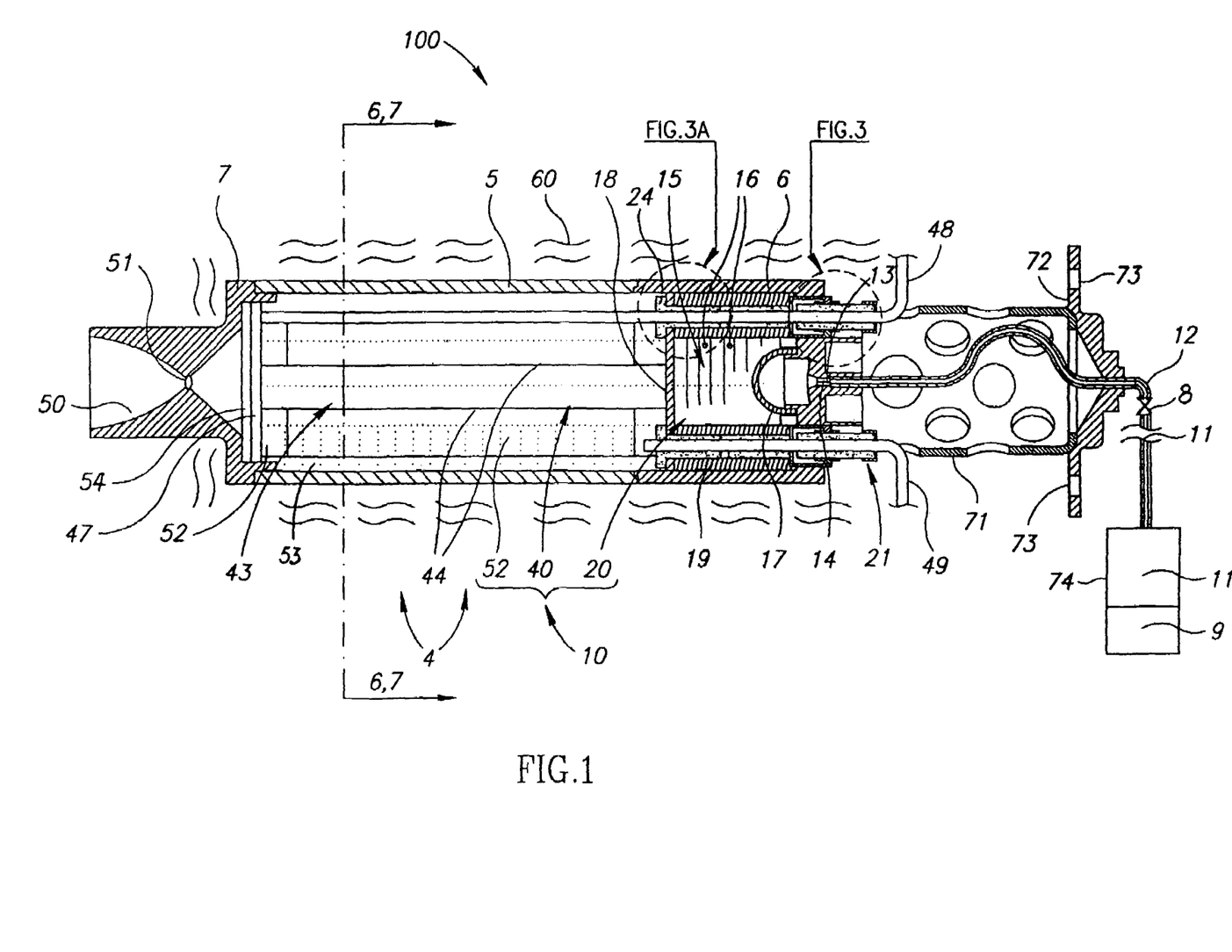
FIG. 1 is a sectional view through an embodiment of the thruster with electro-thermally augmented thrust.

More details about the superheater, or superheater section are provided in relation to FIG. 1, as recited from column 3, line 63 to column 4, line 4: "In FIG. 1, one embodiment of a superheater section 17 is provided for the heater chamber 11 and comprises an elongate cylindrical chamber 18 axially aligned with and abutting the heater chamber. The cylindrical chamber 18 terminates in an annulus 19. A hollow, electrically heated, coiled rhenium tube 20 is disposed centrally along chamber 18 and receives decomposed gases from the heater chamber 11 at its outlet 11a; the tube 20 terminates in a nozzle 21 which fits into the chamber annulus 19."

Murch et al. use vertical flow of gas through a coiled rhenium tube, but not axial flow and ceramic heaters as with the present invention.

U.S. Pat. No. 4,656,828 to Bingley et al. is for a temperature control system, as by its title: "Augmentation heater temperature control system". It is also stated in column 1, lines 5-6:" This invention relates to a temperature control system for an augmentation heater for a hydrazine thruster", and is further recited in column 1, lines 31-36: "In accordance with one embodiment of the present invention the augmentation heater wire element is maintained at the same temperature by a control circuit which connects and disconnects the battery bus to and from the heater wire element in accordance with the resistance sensed across the heater wire element".

U.S. Pat. No. 5,819,526 to Jackson et al. for a propellant feed system is entitled accordingly as "Low power arcjet propellant feed system". Jackson et al. recite in column 2, lines 31-42: "In accordance with the teachings of the present invention, a low power arcjet propellant feed system for delivering propellant to a low power arcjet is disclosed. The low power arcjet propellant feed system provides a substantially continuous and stable low flow rate of a gaseous propellant to the low power arcjet. This substantially continuous and stable low flow rate enables precision thrust control of the low power arcjet and stable arcjet operation. Moreover, the substantially continuous and stable low flow rate can be controllably adjusted so that the thrust from the low power arcjet can be dynamically varied over a wide range as required".

To remove possible doubts, there is also recited in column 2, lines 56-61: "Use of the present invention provides a low power arcjet propellant feed system for delivering propellant to a low power arcjet. As a result, the aforementioned disadvantages associated with utilizing the currently available propellant feed systems have been substantially eliminated."

The prior art thus does not disclose, teach or suggest the subject matter of the present invention.

Owing to the corrosive effects of the hydrazine products on the commonly used resistive heater filaments, it is currently taught by the above-mentioned patents and by many other sources, that any direct contact between the hydrazine products and the hot resistor filament of a heater should be avoided. Direct contact is avoided by placing some kind of a partition, or wall, between the heater and the hydrazine products, thereby preventing direct heat transfer to the hydrazine's gaseous products. However, indirect heating complicates the thruster's structure, adds to its weight, increases response time, and boosts costs. Moreover, indirect heating calls for a larger temperature difference between the heater and the heated gas than would be otherwise necessary, because of the additional thermal resistance penalty inflicted by the partition.

The higher heater temperature also leads to a shorter heater operational life, to higher heat losses, and therefore to higher power requirement for a given performance. In addition, regarding thermal isolation and heat removal of excess heat from the EV, the problems involved become more elaborate, requiring sophisticated and expensive solutions. Evidently, the heat loss from the heater must be removed out of the EV.

The electro-thermally augmented thruster with internal heaters, as by the present invention, overcomes or significantly reduces the aforementioned problems.

DISCLOSURE OF THE INVENTION

The thruster with electro-thermal thrust augmentation and with internal heaters takes advantage of the direct heating of the gaseous products released by a propellant within EV thrusters, and relates especially to hydrazine, so as to increase the Specific Impulse (Isp) of the EV's thrusters. According to the present invention, a new type of heater, with a better resistance to hydrazine products is used, whereby the hydrazine products are brought in direct fluid-dynamic contact with the new type of heaters, which are imbedded in the interior of the thruster, thus simplifying thruster design, lowering weight, reducing cost, and decreasing thermal losses.

There are two main reasons for the decrease of the thermal losses:

a. The direct contact of the hydrazine products with the new type of heater drastically lowers thermal resistance, and permits to decrease the temperature of that heater while still providing the required heat to the gaseous products.

b. The heater is embedded, thus mounted well within the thruster's chamber rather than exterior or adjacent an external surface thereof, thereby lowering thermal losses.

The lower thermal losses increase the additional thrust obtained from a given electro-thermal heating power and simplify the thermal design of the thruster and of the thermal protection of those EV portions and parts close to the thrusters.

The results of two computerized simulations of the reaction process for an electro-thermally augmented thruster, by which a higher Isp is obtained, are listed below by way of example only, and in order to roughly indicate the expected performance improvement.

For a 0.5 N augmented thruster fed by a blow-down propellant tank and operated with 300 W of electric heating power, the results of the simulations at varied inlet pressures provided the following performances:

a. At high pressure supply (Beginning of Life), producing a thrust of 0.46 N, the Isp is 2700 N-sec/kg, or a 23% improvement over the Isp of a common-use thruster.

b. At low pressure supply (End of Life) producing a thrust of 0.24 N thrust, the Isp is 2950 N-sec/kg, or a 34% improvement over the Isp of a common-use thruster.

The advantages offered by the present invention ensue from heating of the gaseous products by direct contact with the heater, and from embedding the heater well within the thruster's chamber rather than on the exterior or near its outer surface. Consequently, this improved design may be used for heating any gaseous products compatible with the heater, and especially for products that chemically attack currently used heaters, such as hydrazine products.

SUMMARY

It is thus an object of the present invention to provide a method for the implementation of a thruster (100) providing electro-thermal thrust augmentation, for use in EVs (exo-atmospheric vehicles) and configured to operate upon command, the thruster having an exterior and an interior with a decomposition section (20) upstream and a heating section (40) downstream. In the decomposition section, the thruster (100) comprises a propellant injection head (13) coupled in fluid communication to a propellant line (12) entering the decomposition section for injection of propellant (11) therewithin, and a catalyst (15) configured as a porous catalytic bed disposed downstream of the propellant injection head, for exothermic decomposition of the propellant into gaseous products. In the heating section, the thruster (100) comprises an electric heating module (43) having at least one electric resistor (44, 81, 82, 144, 244) configured for heating the gaseous products, and a nozzle (50) having a throat (51) and an expansion cone, extending downstream away from the heating section for accelerating and ejecting heated gaseous products to the exterior of the thruster for providing thrust. On the exterior, the thruster (100) also comprises a blow-down pressurized propellant tank (74) fluidly coupled to and upstream of the propellant line, a control valve for controlling duration of propellant supply via the propellant line, a flow restrictor (8) disposed downstream of the propellant tank through which the propellant flows and operative to reduce mass flow rate variations and deviations caused by changes of the pressure delivered by the blow-down pressurized propellant tank, a radiation shield (60) substantially enveloping a closed sealed chamber (10) of the thruster, and an electric power source controllably coupled to the heating module and operating at a nominal power level. The thruster (100) is characterized in that the thruster is configured as a shell (4) having a shell exterior and a shell interior that forms the closed sealed chamber (10) which is divided into the decomposition section and the heating section, and that in the heating section, the at least one electric resistor is accommodated in either one of both dispositions, directly in the porous catalytic bed, and within a concentric ceramic tube (83) operative as a heat exchanger, whereby the gaseous products are heated by direct contact.

It is another object of the present invention to provide a thruster (100) wherein the at least one electric resistor is made of either one of both silicone-carbide and molybdenum disilicide, to indirectly heat the catalyst in the decomposition section and to directly heat the heating section. The heating module, or the at least one electric resistor, is operated for a controlled limited period of time for pre-heating the catalyst prior to firing the thruster, and is configured to provide a large heat exchange surface for direct contact with the gaseous products.

It is yet another object of the present invention to provide a thruster wherein the a porous bed disposed in the heating section is operative in either one of both configurations as only pellets of catalyst, and as a mixture of pellets of catalyst with pellets of an additive thus as the catalyst alone and as a mixture of the catalyst with an additive. If desired, the additive is selected as silicone carbide.

It is yet one more object of the present invention to provide a thruster (100) wherein the at least one resistor includes a plurality of resistors electrically coupled in appropriate parallel and serial electrical connection to provide low electric resistance and a large heat exchange surface, thus with the required electric resistance and with an enlarged heat exchange surface.

It is still another object of the present invention to provide a thruster wherein on the exterior of the shell, a power processor (200) is electrically coupled to and disposed downstream of the electric power source. The electric power source comprises a voltage converter (220) for up-converting a varying voltage supply, provided thereto via electric coupling from the electric power source, into a higher voltage for input to the shell, and a duty cycle controller (210) coupled to and downstream the converter, and configured for adapting electrical power for supply to the shell according to electrical power available from the electrical power source, whereby the thruster is operable at an average power level lower than the nominal power level. The electric power source supplies electric power to the heating module via electrically insulated leads (48, 49) penetrating through the shell in hermetical sealing.

BRIEF DESCRIPTION OF THE FIGURES

In order to understand the invention and to see how it may be carried out in practice, a preferred embodiment will now be described, by way of non-limiting example only, with reference to the accompanying drawings, in which.

DETAILED DESCRIPTION OF THE INVENTION

With reference to FIG. 1, hydrazine thruster 100 includes shell 4, defining an interior and an exterior, and forming on the interior, a closed and sealed chamber 10. The shell 4 is substantially cylindrical, with a longitudinal axis. Shell 4 may be formed from a number of parts joined together to prevent leakage of gasses to the exterior. Such parts of the shell 4 are a cylindrical sleeve 5, with propellant feed plug 6 upstream, and a gaseous products discharge plug 7 downstream. Hydrazine, serving as propellant 11 supplied out of a propellant tank 74 driven in blow down mode by a pressurization gas 9, flows downstream therefrom through a flow restriction unit 8, or flow restrictor 8, which reduces the deviation of the propellant mass flow rate relative to the pressure of the pressurization gas 9.

Propellant 11, for example a monopropellant and particularly hydrazine, flows in line 12 via a control valve, such as a solenoid valve, located exterior to shell 4 and not shown in the Figs., but known to the art. The control valve controls the duration of supply of the propellant 11. Propellant line 12 penetrates inside the shell 4, thus into chamber 10, through hermetically sealed passage 14, formed in propellant feed plug 6. The propellant 11 is injected into chamber 10 via propellant injection head 13 connected to line 12, then passes through meshed hemispherical screen 17, and finally flows to meet a catalyst 15, configured as a porous bed. Resting on plug 6 is hemispherical screen 17, which separates the catalyst 15 from coming in contact with injection head 13. A ceramic tubular spacer 19 is inserted between propellant feed plug 6 and screen 18, inside sleeve 5, to confine the flow of propellant 11 through the center of chamber 10.

Catalyst 15 is a porous catalytic bed formed by iridium coated alumina pellets 16, confined between plain screen 18, hemispherical screen 17, and spacer 19.

On the exterior of shell 4, a radiation shield 60 practically envelops the mantle of shell 4, and surrounds sleeve 5. Radiation shield 60 is used to wrap the shell 4 to lower thermal losses to the surroundings.

The interior portion of shell 4, or chamber 10, extending between plug 6 and screen 18, defines the decomposition section 20. The remaining downstream portion of chamber 10, extending between screen 18 and discharge plug 7, defines the heating section 40 of the chamber 10. The term "decomposition section" is used even though dissociation process also occurs in the chamber 10. The catalyst 15 fills the decomposition section 20.

A passage, serving as a sonic throat 51 of nozzle 50, passes through plug 7 of heating section 40, with the nozzle 50 and an expansion cone extending outward of plug 7 and away from section 40.

It is noted that the shell 4 is configured for operation both in space and under common terrestrial environmental conditions at sea-level gravity and sea-level barometric pressure.

One end of perforated tube 71 is attached to the external side of plug 6, and the other end of tube 71 is attached to flange 72, which includes bores 73 necessary to assemble the thruster to an EV. In order to reduce conductive heat transfer out of chamber 10, the tube 71, which is coupled to the EV, is perforated, thereby turning the tube 71 into a thermal barrier.

Figure 2A:
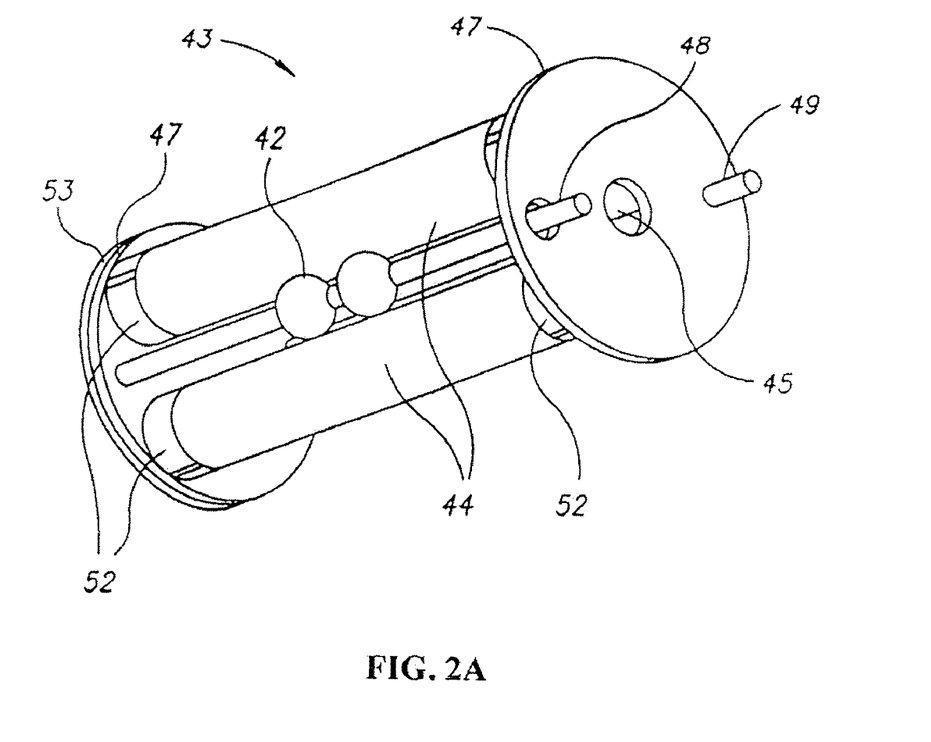
FIG. 2 shows a first embodiment of electric heaters.
Figure 2B:
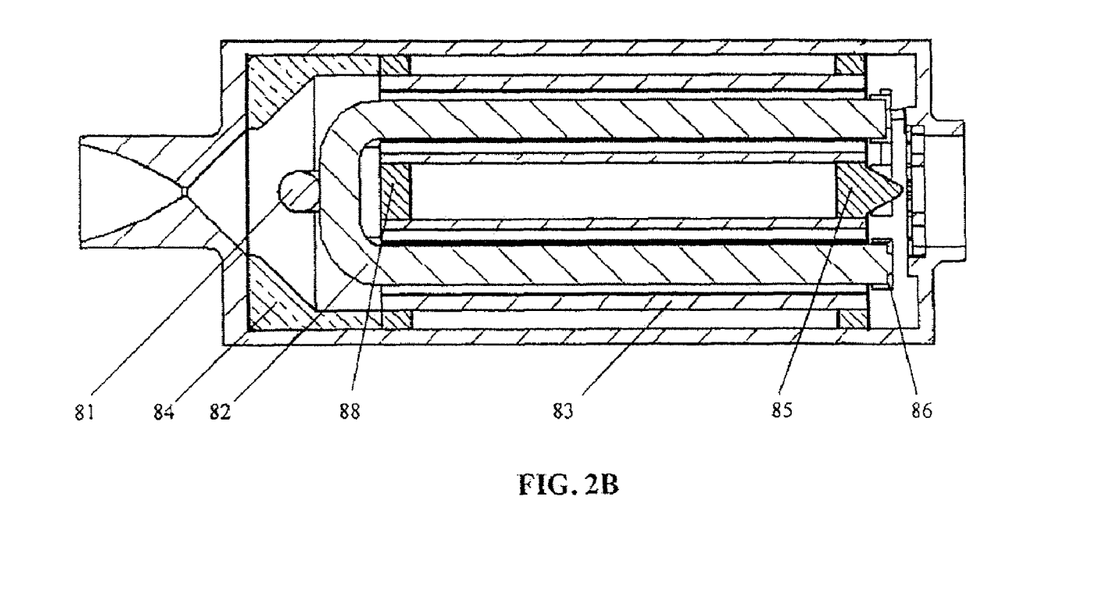
Figure 2C:
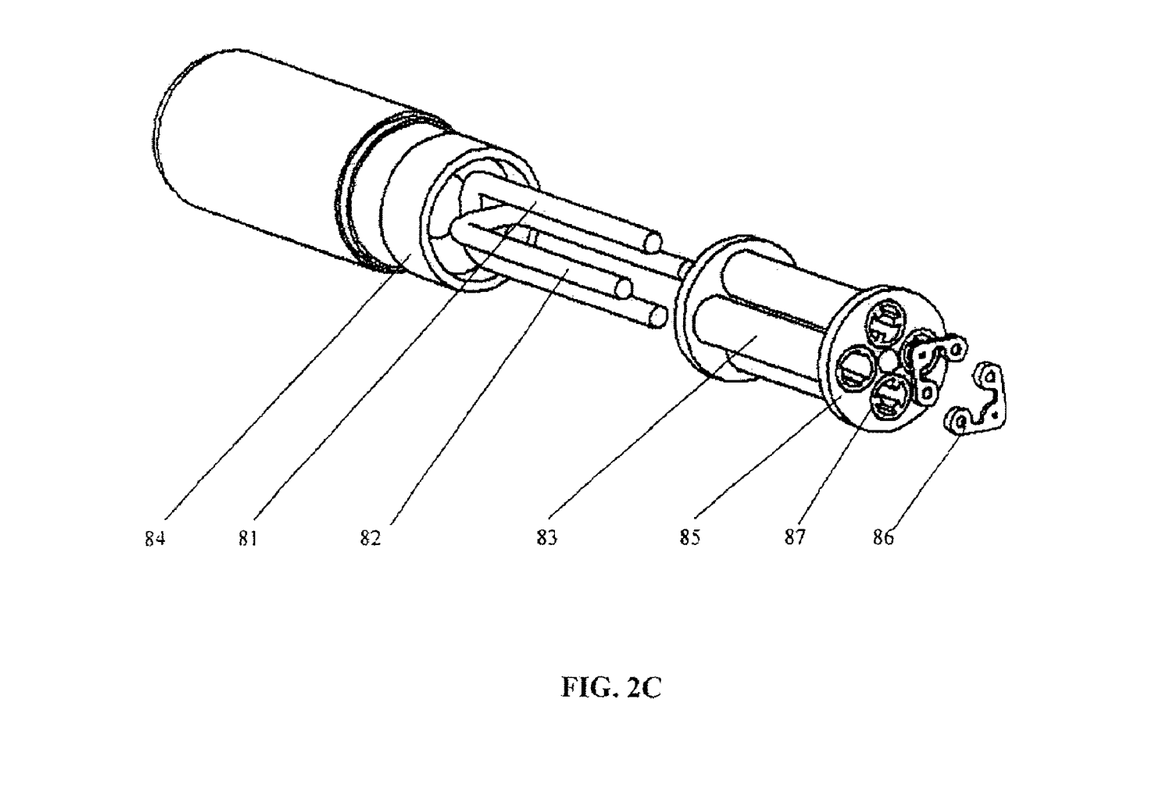

With reference to FIG. 2, an electrically operated heating module 43 illustrates a number of ceramic, or silicone carbide (SiC), or molybdenum disilicide $MoSi_2$ electric resistors 44, or resistors 44. For example, four resistors 44 coupled in series.

This first exemplary basic embodiment of the heating module 43, has four resistors 44 of circular cross section, of which only two are seen in FIG. 2. Metallic clamps 52, shown only in FIG. 2, are attached to both extremities of each resistor 44, each clamp being electrically coupled to either lead 48 or lead 49.

In a second embodiment of the heating section 40, not shown in the figures, first and second U-shaped electric are provided and each have two longer straight longitudinal parallel arm portions and a shorter base portion. Each U-shaped resistor may be considered as implementing two resistors 44 coupled in series. Both U-shaped resistors may be disposed with their arm portions in parallel, and with their respective base perpendicularly adjacent to each other, downstream near the side of the discharge plug 7, which is indicated in FIG. 1. The arm portion of each U-shaped resistor may be covered by a coaxial concentric external tube 83, such as shown schematically by one short tube section in FIG. 2. Longitudinal fins may be accommodated inside each external tube 83 to firmly support a respective arm portion of each U-shaped resistor.

If desired, although not shown in the Figs., the first and second U-shaped resistors may be of identical shape and dimensions, but disposed with their base portion side-by-side in parallel, instead of in cruciform disposition.

An upstream disc may be disposed upstream and appropriately configured with four bores, for each bore to slide over and support a free-end section of the U-shaped resistors. The perimeter of the upstream disc may be received and retained in place by the internal diameter of the cylindrical sleeve 5 forming the housing of the heating section 40. Likewise, a downstream disc, also appropriately configured with four bores, may be located adjacent the base of each U-shaped resistors. Each bore of the downstream disc may support the downstream arm section of the U-shaped resistors, adjacent their base portion, whereas the downstream disc may be received and retained in place by the internal diameter of the cylindrical sleeve 5 forming the housing of the heating section 40.

To help direct the flow of the gaseous hydrazine products, the upstream disc may be accommodated with a centrally located protruding cone extending upstream toward the plain screen 18, seen in FIG. 1. Furthermore, a cylindrical downstream spacer may be disposed intermediate the downstream disc and the discharge plug 7, with a central opening having an open ended funnel-shaped conical portion, to direct the flow of hot propellant product gasses from a larger diameter opening toward a smaller diameter opening, toward the discharge plug 7.

The external tubes may be made of electrically non-conductive ceramic materials, such as Silicone Carbide (SiC), and so may be the downstream spacer, the upstream disc, and the downstream disc. In contrast, the resistors 44, the U-shaped resistors, and a single resistor 144 described below, may be made of electrically conductive silicone carbide (SiC), or of molybdenum disilicide (MoSi2).

An electrical connector is attached to both free-end section extremities of each U-shaped resistor. Each electrical connector is then electrically coupled to electric leads as desired, such as to lead 48 and 49. Electrical power is supplied for heating the resistors U-shaped resistor.

Each U-shaped resistor 81 and 82 may be considered as implementing two resistors 44 coupled in series, and when these two U-shaped resistors 81 and 82 are coupled in parallel, then their electric resistance equals one fourth of the resistance of four resistors 44 coupled in series.

In the second embodiment of the heating section 40, the hot gaseous hydrazine products flow via a narrow annular confinement of hot surfaces, thus in the space provided between the arm portion of each U-shaped resistor, and within the interior of its respective surrounding external tube 83, having a high convective heat transfer coefficient. Each external tube 83 may be heated to a high temperature due to the high emissive coefficient of the U-shaped resistors, or ceramic heaters.

Figure 6:
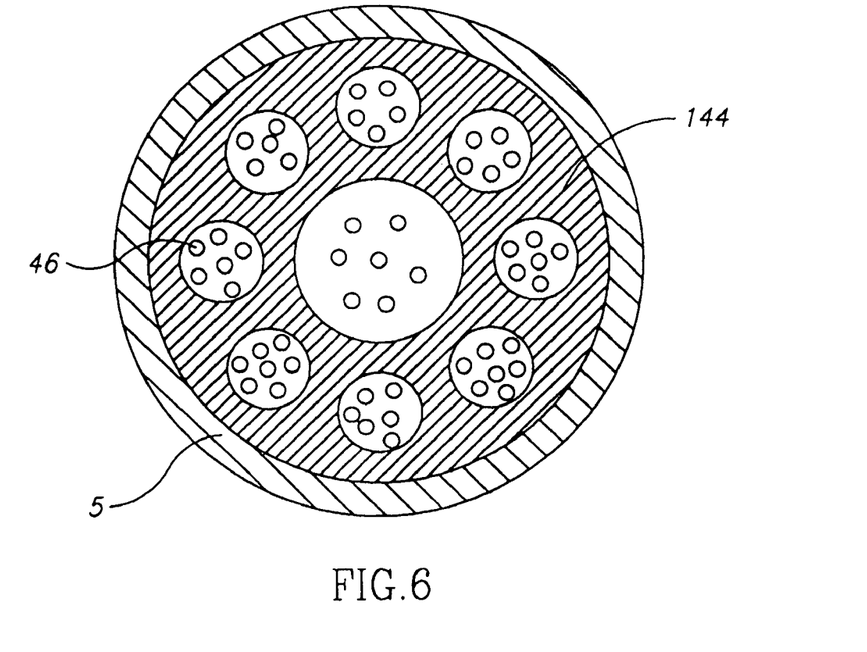
FIG. 6 presents a sectional view through a second resistor embodiment.

In a third embodiment of the heating module 43, shown in FIG. 6, and depicting a possible cross section 6-6 of FIG. 1, a single electric resistor 144, or resistor 144, is embodied, including axial cylindrical passages therethrough. It is noted that only FIG. 2 is a true geometric representation of the cross section of FIG. 1. Sections 6-6 and 7-7 indicated on FIG. 1, and shown respectively in FIGS. 6 and 7, feature respectively, a third embodiment and a fourth embodiment of an arrangement of resistors, which differs from the first basic embodiment shown in FIG. 1, and therefore are not an accurate depiction of the cross section of FIG. 1. In the fourth embodiment shown in FIG. 7, resistors 244 having a star-like cross section providing large heat exchange surfaces, form the heating module 43, as opposed to the circular cross-sections implemented in the first basic embodiment and in the third embodiment.

Electric power raises the temperature of all the resistors, 44, 81, 82, 144, or 244, to at least 1600° C., and preferably to 1700° C. and higher.

The heating section 40 contains a catalyst 15 formed as a porous catalytic bed. However, although the decomposition section 20 contains only pellets of the catalyst 15, the porous catalytic bed of the heating section 40 preferably contains a mixture 46 made of pellets of catalyst 15 with of pellets of an additive, such as small silicone carbide pellets 53, or of another additive. When reference is made hereinbelow to the heating section 40, it is assumed that the interior thereof is filled either with a porous bed of catalyst 15, or with a concentric ceramic external tube 83. The porous bed in the heating section 40 is thus configured either as only pellets of catalyst 15, or as a mixture 46 of pellets of catalyst 15 with pellets of an additive 53.

Figure 7:
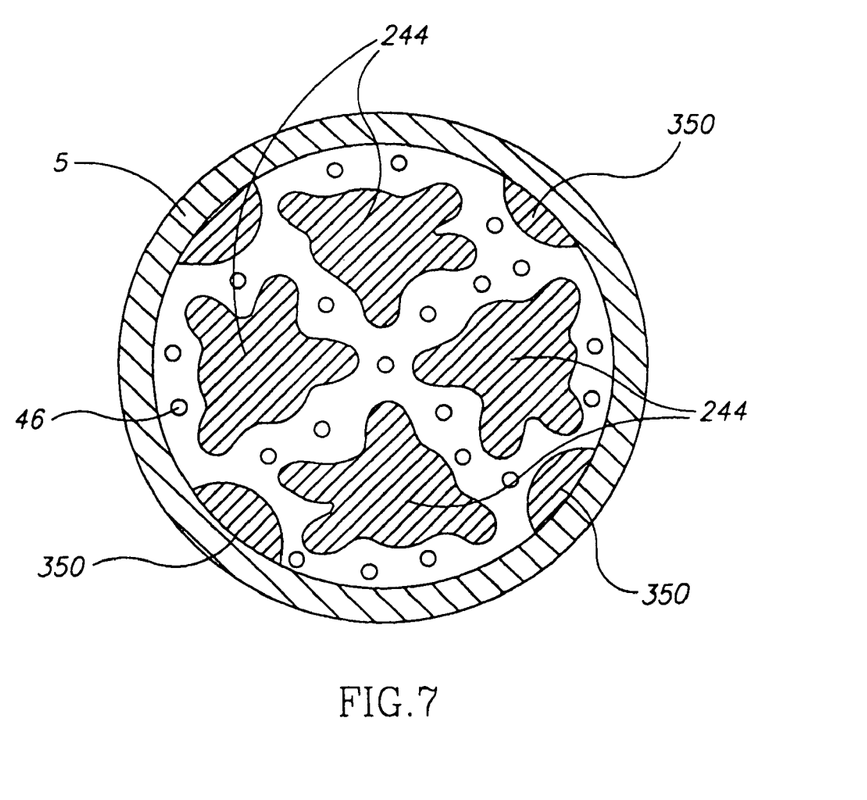
FIG. 7 presents a sectional view through a second resistor embodiment.

In each one of the first, third, and fourth embodiment of the heating module 43, voids in the heating section 40 are filled with the catalyst 15, such as the pellets mixture 46, as indicated in FIGS. 6 and 7. The enhanced heat transfer properties of the additive serve to improve the heat exchange process resulting in higher gas temperature.

Ceramic rods 350, shown in FIG. 7, which duct the flow toward the center and along the axis of the heating section 40, are attached to sleeve 5 by means of a welded toggle, not shown in the Figs. In the first embodiments depicted in FIGS. 2A and 7, two electrically insulating holders 47, shown only in FIG. 2A, retain together resistors 44 and 244. Each insulating holder 47 has at least one aperture 45 accommodated to permit the flow of the hot gasses therethrough. In all of the shown configurations, screen 54 is attached to holder 47, at least adjacent discharge plug 7, to prevent spilling of the pellets mixture 46 through aperture 45. The configuration of the resistors 144 and 244, shown in FIGS. 6 and 7 is intended to increase the surface of the heat exchange area of direct contact between the resistors and the propellant 11, or hydrazine products. This surface increase in the heat exchange area of direct contact improves heat transfer between the resistors and the hydrazine products, lowering the temperature difference therebetween, thus lowering the temperature to which the resistors are required to be heated. The endurance and the operational life expectancy of the resistors are thereby extended.

Insulating holders 47 are sized to fit and to be supported inside shell 4, or chamber 10, and to prevent resistors 44 and 244 from contacting metallic parts of the chamber.

A positive electrical lead 48 and a ground electrical lead 49 are electrically coupled to resistors 44 via clamps 52, attached to each extremity of the respective resistors, to supply electric power for their heating. Leads 48 and 49 are electrically insulated by means such as ceramic beads 42 strung thereon. Likewise, resistors 144 and 244 are electrically fed by similar means, well known to the art. Insulating holders 47, resistors 44 or 244, and leads 48 and 49, are assembled to form the heating module 43, fitting inside the heating section 40.

Similar means may be used to form the heating section 40 with the U-shaped resistors, and with the single resistor 144.

Figure 3:
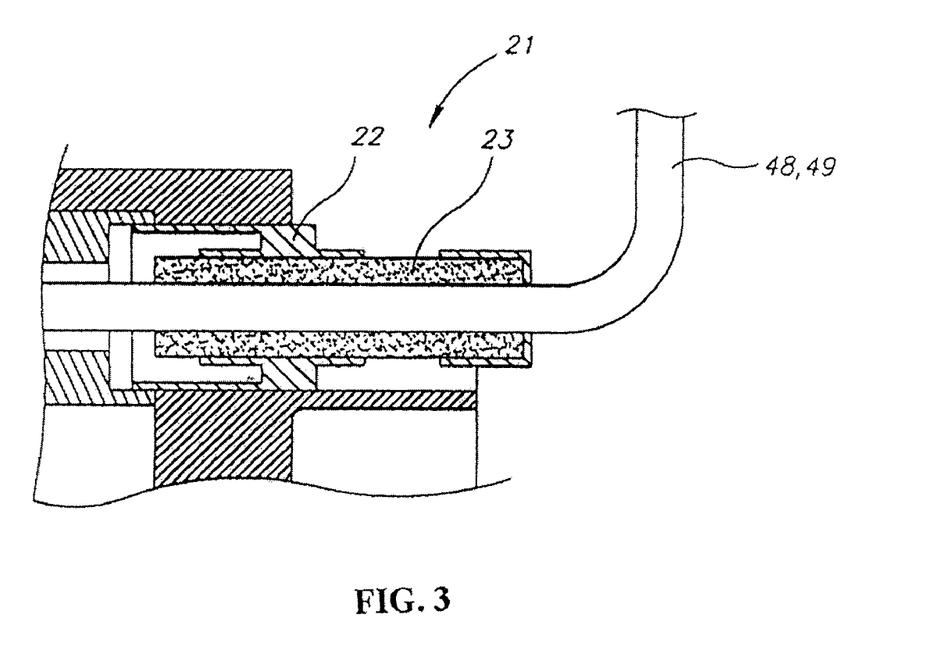
FIG. 3 illustrates an electric feed-through, FIG. 3A shows an insulating support.

FIG. 3 shows how the leads 48 and 49 sealingly penetrate inside shell 4. Each one of the leads 48 and 49 passes through a respective feed through 21, which is hermetically sealed, hence impervious to gasses. Feed through 21 includes a ceramic insulating sleeve 23 wherethrough leads 48 and 49 pass, as well as a metallic support 22 for sleeve 23.

Figure 3A:
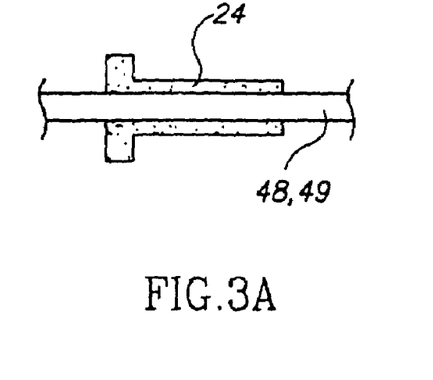

Further downstream interior to shell 4, as shown in FIG. 3A, each one of leads 48 and 49 is protected by insulating support 24 to prevent short-circuit as a result of contact of a lead 48 or 49 with plain screen 18. The same is true for the first to fourth embodiment of heaters.

Figure 4:
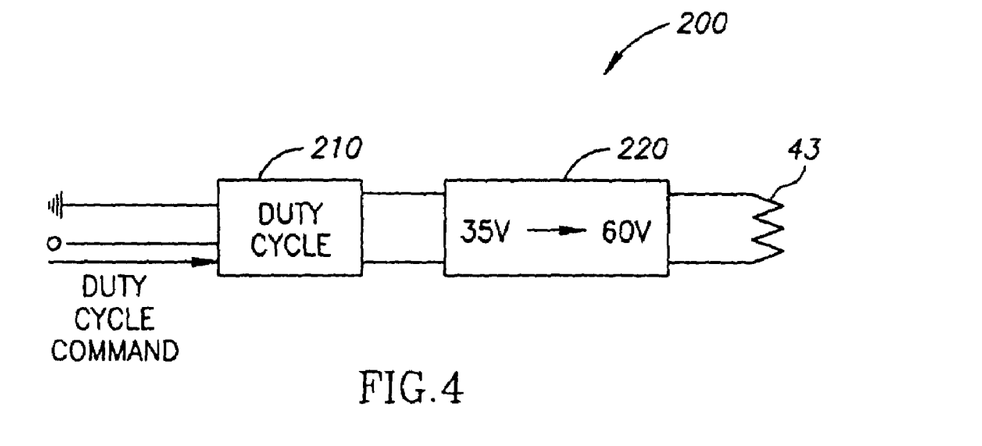
FIG. 4 is a schematic depiction of a power processor.

Reference is now made to FIG. 4. Electrical power from a power source, located exterior to shell 4 and not shown in the Figs., is preferably processed by power processor 200, which is electrically coupled to heating module 43. Power processor 200 may include a duty-cycle control unit 210 and preferably includes a voltage converter 220. Duty cycle control unit 210 controls the time fraction during which power is supplied to the heating module 43.

Figure 5:
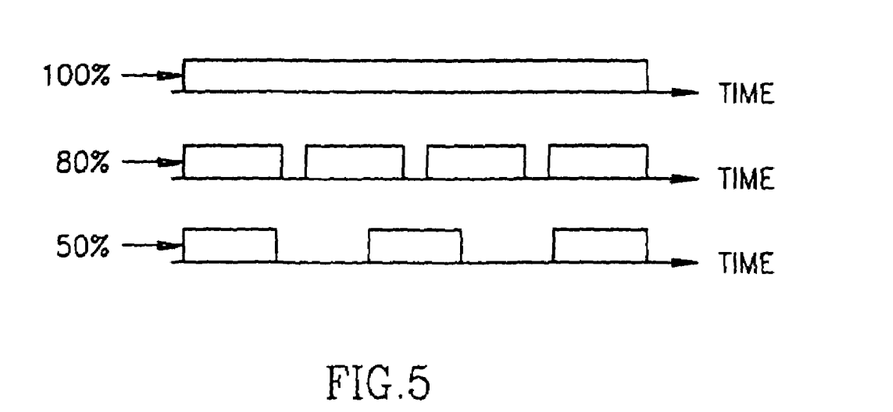
FIG. 5 is a schematic diagram of three duty cycles.

Time fraction supply of electricity is shown schematically in FIG. 5. When in continuous operation over time, designated as 100% in FIG. 5, then 100% of power is supplied to the heating module 43. However, when only a portion of the nominal electrical power is available, e.g. 300 W, a less than 100% duty cycle may be used for operation of the thruster 100. For example, in case only 80% of the nominal electrical power is available, and the same when even as low as only 50% is available, are both illustrated in FIG. 5. Evidently, any other percentage ranging between 100% and 50% is practical too.

Voltage converter 220 up-converts the input voltage received from the electrical input voltage residing in the EV. The input voltage, typically about 35 V, is converted into a higher converter-output voltage, in the range of 35 V to 60V. Optionally, other input voltages may be used, and the converter-output voltage is possibly different or variable.

The available electric power output of power processor 200, which is much higher than only a few watts, is applied to the heating module 43 during only a short controlled period of time prior to firing the thruster into operation, to heat the catalyst 15 and the mass of the heating section. This heating mode eliminates the need for a separate heater dedicated solely to the catalyst 15, as is necessary with commonly known types of thrusters. Use of the heating module 43 prior to operation of the thruster eliminates the requirement to continuously operate an external heater during the whole life cycle of the EV, as is the practice with prior art methods. An exterior heater is thus saved, thereby reducing costs, and permitting a simple thruster structure and efficient control logic.

The thruster with electro-thermal thrust augmentation described above, operates as follows:

A computer unit, outside shell 4 and not shown in the Figs., emits a command to switch-on the supply of electric power to heat-up the heating module 43 before opening the propellant valve for supply of propellant 11. The heat-up process raises the temperature of the heating section 40 and of the porous bed of pellets mixture 46, and thus also raises the temperature of the heating module 43, as well as that of the mass of the heating section. The catalyst 15 filling the decomposition section 20 will be heated too.

A few minutes later, after the heating section 40 is heated up, a command to the flow control valve will let the propellant 11 flow downstream through line 12. The propellant 11 is injected into decomposition section 20, via injection head 13, then passes through meshed hemispherical screen 17, and reaches catalyst 15. Exothermal decomposition takes place in decomposition section 20, to later partly evolve into a dissociation process. The hot gaseous products proceed downstream past screen 18, and enter the heating section 40, to flow along, for example, the heated resistors 44 of heating module 43 and through the porous bed mixture 46 of hot pellets. Direct fluid-dynamic contact with the heated resistors 44 and with the pellets-mixture 46 enhances convective heat transfer to the hot gaseous products. Further thermal dissociation progresses as a result of the high temperature to which the gaseous products are heated. In other embodiments of the heating section 40, the gaseous products are heated by flowing along resistors, or along resistors 144 or 244 and along the pellets mixture 46.

The net result of an adequate heating process is an increase of temperature of the gaseous products. This process provides a higher Specific Impulse, Isp. The increase of Isp due to the heating process described above is equivalent to an increase in the total impulse for a given mass of propellant 11. Therefore, less propellant 11 is consumed for a given maneuver, when compared to the propellant consumption of a conventional thruster without an embedded heater.

It will be appreciated by persons skilled in the art, that the present invention is not limited to what has been particularly shown and described hereinabove. For example, propellants other than hydrazine may be used and heaters of various designs may be implemented inside chambers of various types. Rather, the scope of the present invention is defined by the appended claims and includes both combinations and sub-combinations of the various features described hereinabove as well as variations and modifications thereof which would occur to persons skilled in the art upon reading the foregoing description.

The invention claimed is:

1. A thruster with electro-thermal thrust augmentation, for use in EVs and configured to operate upon command, the thruster having an exterior and an interior with a decomposition section upstream and a heating section downstream, the thruster comprising:
   in the decomposition section:
      a propellant injection head coupled in fluid communication to a propellant line entering the decomposition section for injection of propellant therein, and
      a catalyst configured as a porous bed disposed downstream of the propellant injection head, for exothermic decomposition of the propellant into gaseous products, in the heating section:
      an electric heating module having at least one electric resistor configured for heating the gaseous products, and
      a nozzle having a throat and an expansion cone, extending downstream away from the heating section for accelerating heated gaseous products to the exterior of the thruster for providing thrust,
   on the exterior of the thruster:
      a blow-down pressurized propellant tank fluidly coupled to and upstream of the propellant line,
      a control valve for controlling duration of propellant supply via the propellant line,
      a flow restrictor through which the propellant flows, disposed downstream of the propellant tank,
      a radiation shield substantially enveloping a closed sealed chamber of the thruster, and
      an electric power source controllably coupled to the heating module and operating at a nominal power level,
   wherein the thruster is configured as a shell having a shell exterior and a shell interior that forms the closed sealed chamber which is divided into the decomposition section and the heating section, and
   in the heating section:
      wherein the at least one electric resistor is accommodated either directly in an additional porous catalytic bed having an additional catalyst or within a concentric ceramic tube and operative as a heat exchanger,
      whereby the gaseous products are heated by direct contact.

2. The thruster according to claim 1, wherein the at least one electric resistor is made of either one of silicone-carbide and molybdenum disilicide.

3. The thruster according to claim 1, wherein the at least one electric resistor indirectly heats the catalyst in the decomposition section and directly heats the heating section.

4. The thruster according to claim 1, wherein the heating module has a heating module mass and is operated for a limited period of time for pre-heating the additional catalyst and the heating module mass of the heating section prior to firing the thruster.

5. The thruster according to claim 1, wherein the additional porous catalytic bed disposed in the heating section is operative in either one of both configurations as only pellets of catalyst and as a mixture of pellets of catalyst with pellets of an additive.

6. The thruster according to claim 1, wherein the heating module is configured to provide a large heat exchange surface for direct contact with the gaseous products.

7. The thruster according to claim 1, wherein the at least one resistor includes a plurality of sub-resistors electrically coupled in appropriate parallel and serial electrical connection to provide low electric resistance and a large heat exchange surface.

8. The thruster according to claim 1, further comprising a power processor on the exterior of the shell, the power processor being electrically coupled and disposed downstream of the electric power source and comprising:
   a voltage converter for up-converting a varying voltage supply, provided thereto via electric coupling from the electric power source, into a higher voltage for input to the shell, and
   a duty cycle controller coupled to and downstream the converter, and configured for adapting electrical power for supply to the shell according to electrical power available from the electrical power source,
   whereby the thruster is operable at an average power level lower than a nominal power level.

9. The thruster according to claim 1, wherein the electric power source supplies electric power to the heating module via electrically insulated leads penetrating through the shell in hermetical sealing.

10. The thruster according to claim 1, wherein the flow restrictor reduces deviations of a propellant mass flow rate.

11. The thruster according to claim 1, wherein the thruster is operable at sea-level gravity and barometric pressure.

12. A method for implementing a thruster with internally embedded heating for providing electro-thermal thrust augmentation operative upon command, the thruster having an exterior and an interior with a decomposition section upstream and a heating section downstream, the thruster comprising:
   in the decomposition section:
      a propellant injection head coupled in fluid communication to a propellant line entering the decomposition section for injection of propellant therein, and
      a catalyst configured as a porous catalytic bed disposed downstream of the propellant injection head, for exothermic decomposition of the propellant into gaseous products,
   in the heating section:
      an electric heating module having at least one electric resistor configured for heating the gaseous products, and
      a nozzle having a throat and an expansion cone, extending downstream away from the heating section for accelerating heated gaseous products to the exterior of the thruster for providing thrust,
   on the exterior of the thruster:
      a blow-down pressurized propellant tank fluidly coupled to and upstream of the propellant line,
      a control valve for controlling duration of propellant supply via the propellant line,
      a flow restrictor through which the propellant flows, disposed downstream of the propellant tank,
      a radiation shield substantially enveloping a closed sealed chamber of the thruster, and
      an electric power source controllably coupled to the heating module and operating at a nominal power level,
   the method comprising:
      configuring the thruster as a shell having a shell exterior and a shell interior that forms the closed sealed chamber which is divided into the decomposition section and the heating section, and
      accommodating, in the heating section, the at least one electric resistor either directly in an additional porous catalytic bed having an additional catalyst or within a concentric ceramic tube operative as a heat exchanger, whereby the gaseous products are heated by direct contact.

13. The method according to claim 12, wherein the at least one electric resistor is made of either one of silicone-carbide and molybdenum disilicide.

14. The method according to claim 12, wherein the at least one electric resistor indirectly heats the catalyst in the decomposition section and directly heats the heating section.

15. The method according to claim 12, wherein the at least one electric resistor is operated for a controlled limited period of time for pre-heating the additional catalyst prior to firing of the thruster.

16. The method according to claim 12, wherein the additional porous catalytic bed disposed in the heating section is operative in either one of configurations as only the additional catalyst and as a mixture of the additional catalyst with an additive.

17. The method according to claim 16, wherein the additive is silicone carbide.

18. The method according to claim 12, wherein the at least one resistor includes a plurality of sub-resistors electrically coupled in appropriate parallel and serial electrical connection to provide low electric resistance and a large heat exchange surface for direct contact with the gaseous products.

19. The method according to claim 12, further comprising a power processor on the exterior of the shell, the power processor being electrically coupled and disposed downstream of the electric power source and comprising:

a voltage converter for up-converting a varying voltage supply, provided thereto via electric coupling from the electric power source, into an appropriate voltage for input to the shell, and a duty cycle controller coupled to and downstream the converter, and configured for adapting electrical power for supply to the shell according to electrical power available from the electrical power source, whereby the thruster is operable at an average power level lower than the nominal power level.

20. The method according to claim 12, wherein the electric power source supplies electric power to the heating module via electrically insulated leads penetrating in hermetical sealing through the shell.

21. The method according to claim 12, wherein the thruster is operable both in space and at sea-level gravity and barometric pressure.

* * * * *